(12) United States Patent
Nakamori et al.

(10) Patent No.: US 8,050,456 B2
(45) Date of Patent: Nov. 1, 2011

(54) VEHICLE AND ROAD SIGN RECOGNITION DEVICE

(75) Inventors: Takuma Nakamori, Wako (JP); Tomoyoshi Aoki, Wako (JP); Sachio Kobayashi, Wako (JP); Naoki Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1032 days.

(21) Appl. No.: 11/919,554

(22) PCT Filed: May 18, 2006

(86) PCT No.: PCT/JP2006/309957
§ 371 (c)(1),
(2), (4) Date: Oct. 30, 2007

(87) PCT Pub. No.: WO2006/129493
PCT Pub. Date: Dec. 7, 2006

(65) Prior Publication Data
US 2010/0014707 A1    Jan. 21, 2010

(30) Foreign Application Priority Data
Jun. 3, 2005 (JP) .................. 2005-164764

(51) Int. Cl.
*G06K 9/00* (2006.01)
(52) U.S. Cl. .................. 382/103; 701/28
(58) Field of Classification Search .......... 382/100, 382/103, 106, 107; 701/23, 27, 28, 200
See application file for complete search history.

(56) References Cited

U.S. PATENT DOCUMENTS 6,091,833 A * 7/2000 Yasui et al. .................. 382/104
6,472,977 B1  10/2002 Pöchmüller
6,636,257 B1 * 10/2003 Harada et al. ................ 348/148
(Continued)

FOREIGN PATENT DOCUMENTS

JP     07-057090 A     3/1995
(Continued)

OTHER PUBLICATIONS

Turk M. A., et al: "Vits-A Vision System for Autonomous Land Vehicle Navigation," IEEE Transactions on Pattern Analysis and Machine Intelligence, IEEE Service Center, Los Alamitos, CA, U.S., vol. 10, No. 3. May 1, 1988, pp. 342-361.

(Continued)

*Primary Examiner* — Anand Bhatnagar
(74) *Attorney, Agent, or Firm* — Arent Fox LLP (57) ABSTRACT

A vehicle and road sign recognition device each includes: image capturing means (2) which captures a color image of a road via imaging means (6); feature value calculation means (4) which calculates a feature value of each pixel corresponding to the color of a road sign on the road from the color components of each pixel in the color image so as to reduce the effect of brightness on the color components; and road sign detection means (5) which detects the road sign on the road from the feature image in which the feature value of each pixel in the color image is arranged so as to match with the position of each pixel in the color image. Thus, it is possible to accurately detect a road sign such as a lane mark from the color image of the road captured via the imaging means such as a camera even if the road illumination state is partially different.

12 Claims, 5 Drawing Sheets

U.S. PATENT DOCUMENTS

| | | | |
|---|---|---|---|
| 6,906,620 B2 * | 6/2005 | Nakai et al. | 340/435 |
| 7,702,425 B2 * | 4/2010 | Hougen | 701/1 |
| 2005/0265579 A1 * | 12/2005 | Nishida | 382/103 |

FOREIGN PATENT DOCUMENTS

| | | |
|---|---|---|
| JP | 11-085999 A | 3/1999 |
| JP | 2000-030058 A | 1/2000 |
| JP | 2003-032669 A | 1/2003 |

OTHER PUBLICATIONS

Ishiguro H., et al: "Mobile Robot Navigation by Visual Sign Patterns Existing in Outdoor Environment," Proceeding of the IEEE/RSJ International Conference on Intelligent Robots and Systems, Raleigh N.C., Jul. 7-10, 1992; [Proceedings of the IEEE/RSJ International Conference on Intelligent Robots and Systems] New York, IEEE, U.S. vol. 1, Jul. 7, 1992, pp. 636-641.

Fernandez J., et al: "Autonomous Navigation in Ill-Structured Outdoor Environment," Intelligent Robots and Systems, 1997. IROS '97, Proceedings of the 1997 IEEE/RSJ International Conference on Grenoble, France Sep. 7-11, 1997, New York, NY U.S.A. IEE, U.S., vol. 1, Sep. 7, 1997, pp. 395-400.

Mori, H. et al. "Color Impression Factor: An Image Understanding Method for Outdoor Mobile Robots," Intelligent Robots and Systems, 1997, IROS 1997, Proceedings of the 1997 IEEE/RSJ International Conference on Grenoble, France Sep. 7-11, 1997, New York, NY, U.S.A. IEEE, U.S., vol. 1, Sep. 7, 1997, pp. 380-387.

* cited by examiner

VEHICLE AND ROAD SIGN RECOGNITION DEVICE

CROSS-REFERENCE TO RELATED APPLICATION

This application is a National Stage entry of International Application No. PCT/JP2006/309957, filed May 18, 2006, the entire specification claims and drawings of which are incorporated herewith by reference.

TECHNICAL FIELD

The present invention relates to a vehicle and road sign recognition device for recognizing a road sign such as a lane mark on a road by processing an image of the road captured via imaging means such as a camera.

BACKGROUND ART

In recent years, there has been suggested a technology for detecting a lane mark such as a white line on a road such as an express highway by capturing an image of the road along which a vehicle travels with imaging means such as a CCD camera mounted on the vehicle and processing the obtained image (for example, refer to Japanese Patent Laid-Open No. Hei 11 (1999)-85999 (hereinafter, referred to as Patent Document 1)).

The white line detection device for a vehicle in Patent Document 1 extracts an edge point (negative edge point) where binary data changes from light (white) to dark (black) over the entire image area and an edge point (positive edge point) where binary data changes from dark (black) to light (white) by using a monochrome image (black and white binary image) of a traffic lane captured by the camera mounted on the vehicle. Then, the white line detection device for a vehicle performs a Hough transform for the positive edge point and the negative edge point separately from each other and combines their Hough transform results to detect a white line.

On the other hand, a road sign (lane mark or road marking) other than a white line such as, for example, a yellow line is occasionally used. In the situation where the road sign other than a white line is detected, it is difficult to accurately detect the road sign from a monochrome image. Therefore, there has been suggested a technology for detecting a road sign using a color image (for example, refer to Japanese Patent No. 3333468 (hereinafter, referred to as Patent Document 2)).

Figure 3:
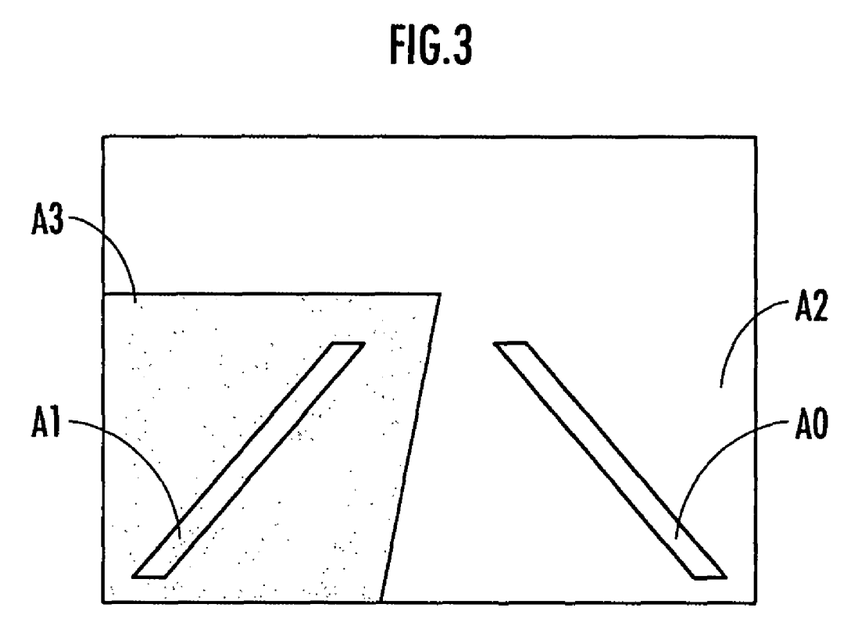
FIG. 3 is an illustrative diagram of a processed image in the road sign recognition process of the road sign recognition device in FIG. 1.

When a road image is captured by a camera, however, the road may be partially shaded by a building around the road, for example, as shown in FIG. 3 or the road may be partially illuminated by the headlights of the vehicle in some cases. If the road image is captured in the situation where the road illumination state is partially different according to the light sources illuminating the road surface or the environment around the road as described above, for example, the shaded area is illuminated only by scattered light and a color feature value of image data varies. Therefore, the yellow line located in this area is not recognized as a line having the original yellow color. Accordingly, there has been a problem that it is difficult to appropriately detect a road sign other than a white line even if a color image is used as in Patent Document 2 in some cases.

DISCLOSURE OF THE INVENTION

Problem to be Solved by the Invention

It is an object of the present invention to solve the above problem and to provide a vehicle and road sign recognition device capable of accurately recognizing a road sign such as a lane mark from a color image of a road captured via imaging means such as a camera even if the road illumination state is partially different.

Means to Solve the Problem

To achieve the above object, according to a first aspect of the present invention, there is provided a vehicle comprising: an imaging means; an image capturing means which captures a color image of a road via the imaging means; a feature value calculation means which calculates a feature value of each pixel corresponding to the color of a road sign on the road from the color components of each pixel in the color image so as to reduce the effect of brightness on the color components; and road sign detection means which detects the road sign on the road from the feature image in which the feature value of each pixel in the color image is arranged so as to match with the position of each pixel in the color image.

Furthermore, according to the first aspect of the present invention, there is provided a road sign recognition device comprising: image capturing means which captures a color image of a road via an imaging means; a feature value calculation means which calculates a feature value of each pixel corresponding to the color of a road sign on the road from the color components of each pixel in the color image so as to reduce the effect of brightness on the color components; and a road sign detection means which detects the road sign on the road from the feature image in which the feature value of each pixel in the color image is arranged so as to match with the position of each pixel in the color image.

In the vehicle and road sign recognition device according to the first aspect of the present invention, the feature value calculation means calculates a feature value of each pixel corresponding to the color of a road sign on the road from the color components of each pixel in the color image. For example, to detect a yellow road sign, the feature value calculation means calculates a feature value corresponding to yellow from the color components of each pixel. This allows the calculation of a feature value noticeably indicating the feature of the yellow road sign.

Note that the color image of the road may include areas different in brightness according to a difference in illumination state of the road surface depending on the light sources illuminating the road surface or the environment around the road. The levels of the color components of each pixel depend on the brightness between the areas different in brightness in the color image. For example, the levels of the color components in a shaded area are lower than the reference levels of the color components which have been set assuming typical brightness of an unshaded area. Moreover, if the road sign (yellow line) is detected on the basis of the color components, it may be difficult to recognize the road sign due to a significant difference between the color components and the reference levels depending on the area.

In this case, the feature value calculation means calculates the feature value so as to reduce the effect of brightness on the color components. Thereby, if the road color image includes areas different in brightness from each other, the feature value is calculated so as to reduce the effect by the difference in brightness between the areas. Moreover, the road sign detection means detects the road sign on the road from the feature image in which the feature value of each pixel in the color image is arranged so as to match with the position of each pixel in the color image, and therefore it can recognize the road sign accurately even if the captured road color image includes areas different in brightness from each other.

Furthermore, in the vehicle and road sign recognition device according to the first aspect of the present invention, the color components of each pixel in the color image are R, G, and B values or C, M, and Y values, and the feature value calculation means uses a ratio between two given values corresponding to the color of the road sign among the color components of each pixel as the feature value of each pixel in the color image.

According thereto, the feature value calculation means uses a ratio between two given values corresponding to the color of the road sign among the color components of each pixel as the feature value of each pixel in the color image. In this instance, the ratio between the two given values noticeably indicates the feature of the color of the road sign. For example, if the feature value (yellow component) corresponding to the yellow line is extracted from the color image when the color components of each pixel are R, G, and B values, the yellow has a tendency of a high R value and a low B value, and therefore the ratio between the R and B values noticeably indicates the feature of the yellow component.

Then, the R, G, and B values or the C, M, and Y values which are the color components of each pixel vary according to the effect of brightness similarly. For example, if each pixel is bright, all levels of the color components of the pixel are high, and if each pixel is dark, all levels of the color components of the pixel are low. Therefore, the effect of brightness on the color components is counteracted by using the ratio between the two given values, by which the feature value is calculated so as to reduce the effect of brightness on the color components. Thereby, the feature value of each pixel in the color image is appropriately calculated so as to be at the same level of brightness.

According to a second aspect of the present invention, there is provided a vehicle comprising: an imaging means; an image capturing means which captures a color image of a road via the imaging means; a luminance value calculation means which calculates a luminance value of each pixel from the color components of each pixel in the color image; a feature value calculation means which calculates a feature value of each pixel corresponding to the color of a road sign on the road from the color components of each pixel in the color image and the luminance value so as to reduce the effect of brightness on the color components; and a road sign detection means which detects the road sign on the road from the feature image in which the feature value of each pixel in the color image is arranged so as to match with the position of each pixel in the color image.

Moreover, according to the second aspect of the present invention, there is provided a road sign recognition device comprising: an image capturing means which captures a color image of a road via an imaging means; a luminance value calculation means which calculates a luminance value of each pixel from the color components of each pixel in the color image; a feature value calculation means which calculates a feature value of each pixel corresponding to the color of a road sign on the road from the color components of each pixel in the color image and the luminance value so as to reduce the effect of brightness on the color components; and a road sign detection means which detects the road sign on the road from the feature image in which the feature value of each pixel in the color image is arranged so as to match with the position of each pixel in the color image.

In the vehicle and road sign recognition device according to the second aspect of the present invention, the luminance value calculation means calculates the luminance value of each pixel from the color components of each pixel in the color image, and the feature value calculation means calculates a feature value of each pixel corresponding to the color of the road sign from the color components of each pixel in the color image and the luminance value. For example, to detect a yellow road sign, the feature value calculation means calculates a feature value corresponding to yellow from the color components of each pixel and the luminance value. This allows the calculation of the feature value noticeably indicating the feature of the yellow road sign.

Note that the color image of the road may include areas different in brightness according to a difference in illumination state of the road surface depending on the light sources illuminating the road surface or the environment around the road. The levels of the color components of each pixel depend on the brightness between the areas different in brightness in the color image. For example, the levels of the color components in a shaded area are lower than the reference levels of the color components which have been set assuming typical brightness of an unshaded area. Moreover, if the road sign (yellow line) is detected on the basis of the color components, it may be difficult to recognize the road sign due to a significant difference between the color components and the reference levels depending on the area.

In this case, the luminance value of each pixel reflects the light and dark distribution throughout the color image of the road according to the illumination state. Therefore, the feature value calculation means calculates the feature value so as to reduce the effect of brightness on the color components by using the luminance value in addition to the color components of each pixel when calculating the feature value. Thereby, if the road color image includes areas different in brightness from each other, the feature value is calculated so as to reduce the effect by the difference in brightness between the areas. Moreover, the road sign detection means detects the road sign on the road from the feature image in which the feature value of each pixel in the color image is arranged so as to match with the position of each pixel in the color image, and therefore it can recognize the road sign accurately even if the captured road color image includes areas different in brightness.

Furthermore, in the vehicle and road sign recognition device according to the second aspect of the present invention, the color components of each pixel in the color image are R, G, and B values or C, M, and Y values; and the feature value calculation means uses, as the feature value of each pixel in the color image, a value obtained by dividing a difference between or sum of two given values corresponding to the color of the road sign among the color components of each pixel by a given correction factor which is determined to be higher as the luminance value increases according to the luminance value of each pixel.

According thereto, the feature value calculation means uses, as the feature value of each pixel in the color image, the value obtained by dividing the difference between or sum of two given values corresponding to the color of the road sign among the color components of each pixel by the given correction factor which is determined to be higher as the luminance value increases according to the luminance value of each pixel. In this instance, the difference between or sum of two given values noticeably indicates the feature of the color of the road sign. For example, if the feature value (yellow component) corresponding to the yellow line is extracted from the color image when the color components of each pixel are R, G, and B values, the yellow has a tendency of a high R value and a low B value, and therefore the difference between the R and B values noticeably indicates the feature of the yellow component. In addition, for example, if a purple component is extracted from the color image when the color components of each pixel are R, G, and B values, the purple has a tendency that the R and B values are both high, and therefore the sum of the R and B values noticeably indicates the feature of the purple component.

Furthermore, the feature value calculation means uses, as the feature value, the value obtained by dividing the difference between or sum of two given values by a given correction factor which is determined to be higher as the luminance value increases according to the luminance value of each pixel. This reduces the effect of brightness on the color components, whereby the feature value of each pixel in the color image is appropriately calculated so as to be at the same level of brightness.

Furthermore, in the vehicle and road sign recognition device according to the second aspect of the present invention, the color components of each pixel in the color image are R, G, and B values or C, M, and Y values; and the feature value calculation means uses, according to the luminance value of each pixel and as the feature value of each pixel in the color image, a value obtained by dividing a difference between or sum of two given values corresponding to the color of the road sign among the color components of each pixel by a given correction factor, which is determined to be higher as the luminance value increases, if the luminance value is equal to or higher than a given luminance value and uses a value obtained by dividing the difference or sum by the given correction factor, which is set for the given luminance value, if the luminance value is lower than the given luminance value.

According thereto, the feature value calculation means uses, according to the luminance value of each pixel and as the feature value of each pixel in the color image, the value obtained by dividing the difference between or sum of two given values corresponding to the color of the road sign among the color components of each pixel by the given correction factor, which is determined to be higher as the luminance value increases, if the luminance value is equal to or higher than the given luminance value and uses the value obtained by dividing the difference or sum by the given correction factor, which is set for the given luminance value, if the luminance value is lower than the given luminance value. In this instance, the difference between or sum of the two given values noticeably indicates the feature of the color of the road sign. For example, if the feature value (yellow component) corresponding to the yellow line is extracted from the color image when the color components of each pixel are R, G, and B values, the yellow has a tendency of a high R value and a low B value, and therefore the difference between the R and B values noticeably indicates the feature of the yellow component. In addition, for example, if a purple component is extracted from the color image when the color components of each pixel are R, G, and B values, the purple has a tendency that the R and B values are both high, and therefore the sum of the R and B values noticeably indicates the feature of the purple component.

Further, if the luminance value of each pixel in the color image is low, the levels color components are considered to be low, too, and therefore the difference between or sum of the two given values is also considered to be low. Moreover, the pixel having the color components of the low levels is assumed not to be a pixel in the image of the road sign to be detected. In this case, if the difference or sum is divided by the given correction factor which is determined according to the magnitude of the luminance value in calculating the feature value of the pixel, there is a possibility that the feature value is unnecessarily amplified. Therefore, the feature value calculation means uses, according to the luminance value of each pixel and as the feature value of each pixel in the color image, the value obtained by dividing the difference between or sum of the two given values by the given correction factor, which is determined to be higher as the luminance value increases, if the luminance value is equal to or higher than the given luminance value and uses the value obtained by dividing the difference or sum by the given correction factor, which is set for the given luminance value, if the luminance value is lower than the given luminance value. Thereby, the feature value can be appropriately calculated so as to reduce the variation of the level of feature value based on the difference in brightness without unnecessarily amplifying the feature value of the pixel not included in the image of the road sign.

Furthermore, in the vehicle and road sign recognition device according to the first and second aspects of the present invention, the road sign detection means detects the road sign on the road by performing a filtering process using a tophat filter or an edge filter for the feature image.

According thereto, the road sign detection means performs the filtering process using a tophat filter or an edge filter for the feature image. In this process, even if the original color image includes a light area like a sunny road and a dark area like a shaded road, the feature values of the pixels in the feature image are calculated so as to be at the same level of brightness and therefore a large difference is observed in the level of the feature value between the road sign and the surrounding road surface in any area of the feature image. Accordingly, the road sign detection means can easily recognize the road sign by performing the filtering process using the tophat filter or edge filter with a threshold value set to a given level.

BEST MODE FOR CARRYING OUT THE INVENTION

Figure 1:
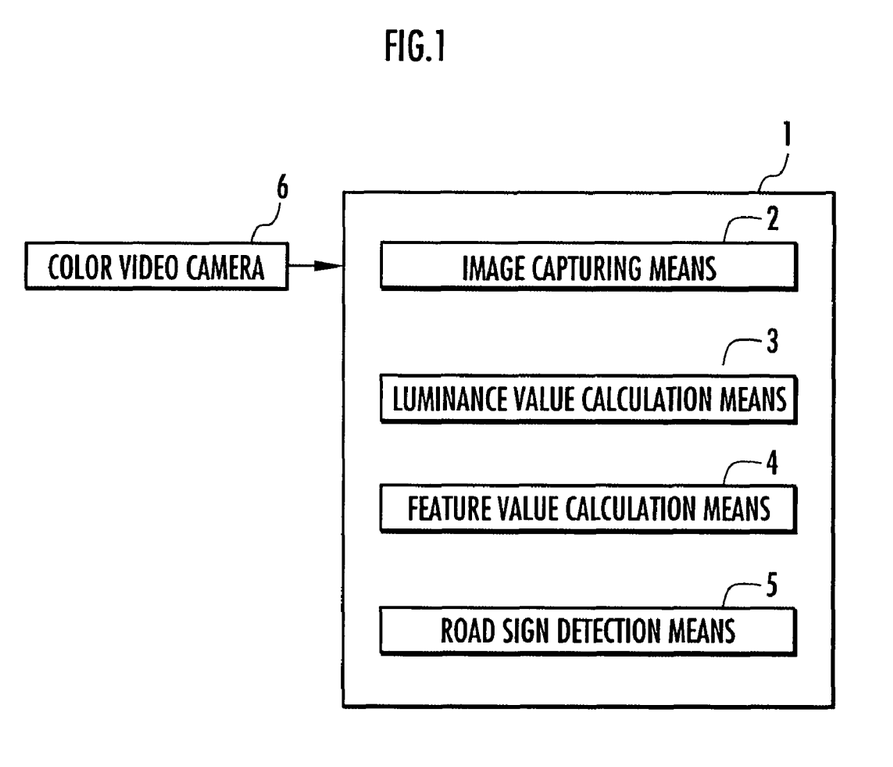
FIG. 1 is a functional block diagram of a road sign recognition device according to a first embodiment of the present invention.
Figure 2:
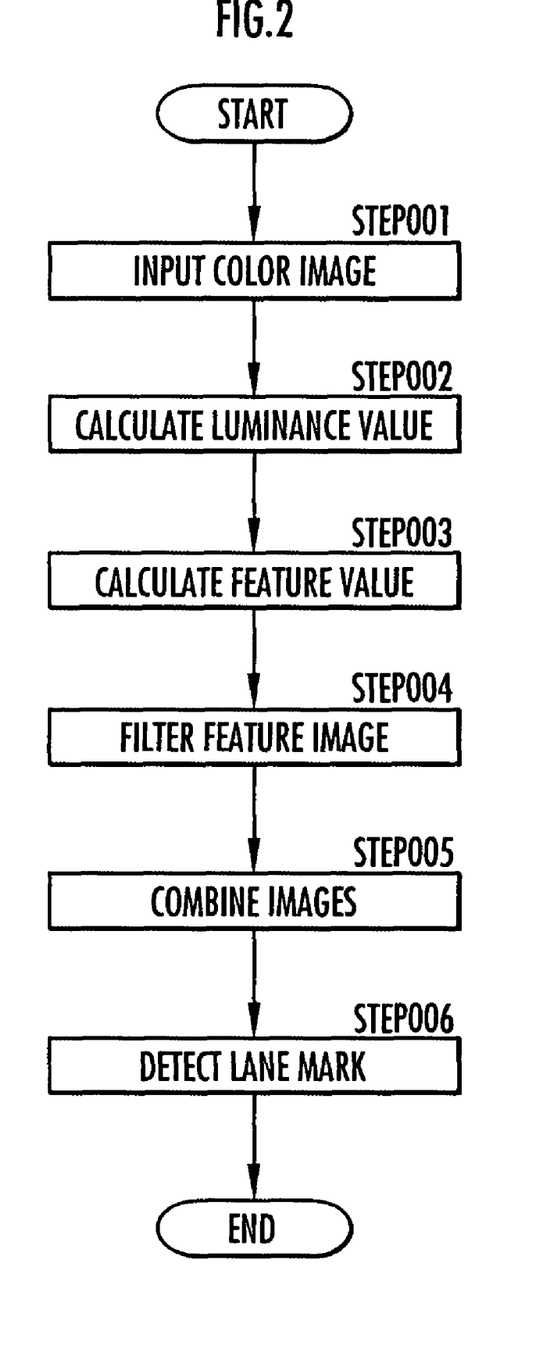
FIG. 2 is a flowchart showing a road sign recognition process of the road sign recognition device in FIG. 1.
Figure 4A:
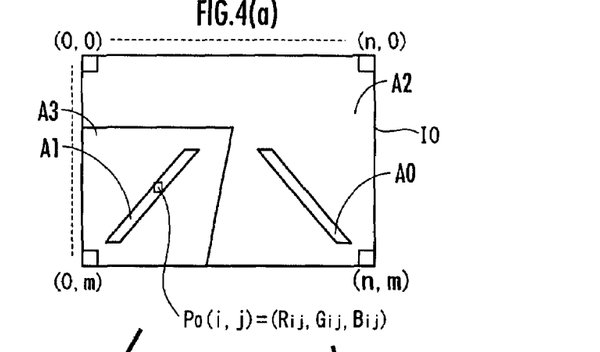
FIG. 4 is an explanatory diagram of generating a luminance image and a feature image and correcting the feature image in the road sign recognition process by the road sign recognition device in FIG. 1.
Figure 4B:
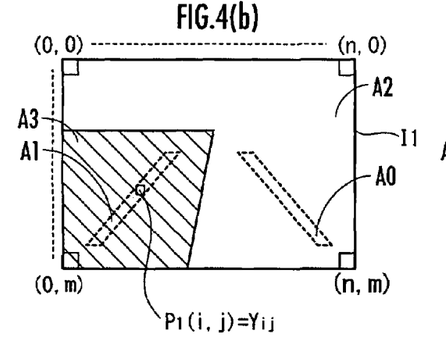
Figure 4C:
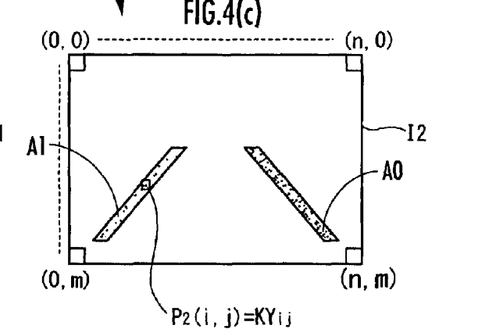
Figure 4D:
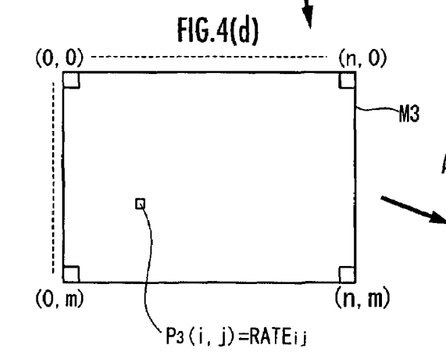
Figure 4E:
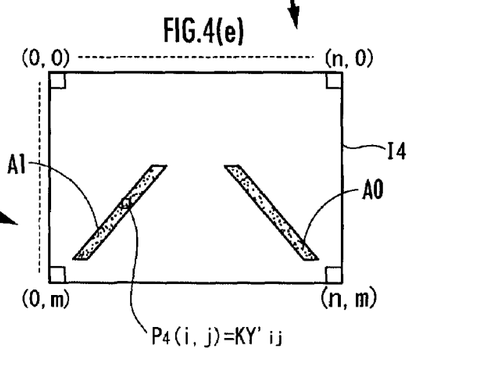
Figure 5:
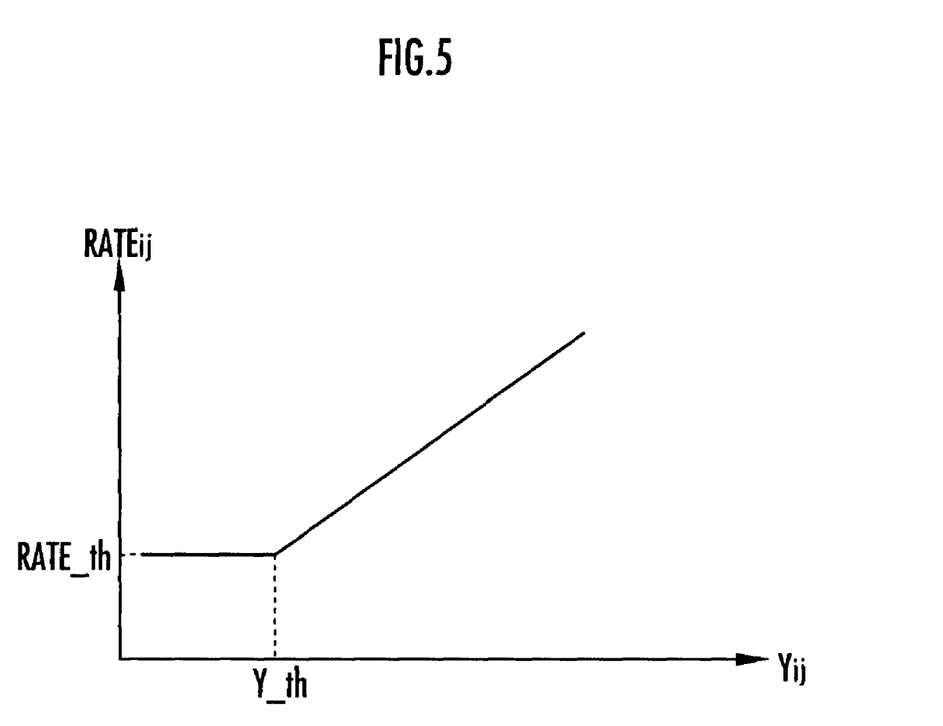
FIG. 5 is a graph showing a relationship between a luminance value of the luminance image and a correction factor of the feature image in the road sign recognition process of the road sign recognition device in FIG. 1.

A preferred embodiment of the present invention will be described below with reference to the accompanying drawings. FIG. 1 shows a functional block diagram of a road sign recognition device according to a first embodiment of the present invention. FIG. 2 shows a flowchart of a road sign recognition process of the road sign recognition device in FIG. 1. FIG. 3 shows an illustrative diagram of a processed image in the road sign recognition process of the road sign recognition device in FIG. 1. FIG. 4 shows an explanatory diagram of calculating a feature value in the road sign recognition process by the road sign recognition device in FIG. 1. Furthermore, FIG. 5 shows a graph showing a relationship between a luminance value and a correction factor in the road sign recognition process of the road sign recognition device in FIG. 1. The first embodiment corresponds to the second aspect of the present invention.

Referring to FIG. 1, the road sign recognition device 1 is an electronic unit composed of a microcomputer and the like and is mounted on a vehicle, including image capturing means 2 which captures a color image of a road, luminance value calculation means 3 which calculates a luminance value from the captured color image, feature value calculation means 4 which calculates a feature value corresponding to the color of the road sign from the captured color image, and road sign detection means 5 which detects a road sign from a feature image generated based on the calculated feature value.

The image capturing means 2 captures a color image composed of pixel data via a color video camera 6 (the imaging means of the present invention such as a CCD camera) which is attached to the front of the vehicle to capture the image in front of the vehicle. Note that the color components of the pixel data are R, G, and B values. The vehicle of the present invention is equipped with the color video camera 6 and the road sign recognition device 1.

The luminance value calculation means 3 calculates a luminance value Y from the color components of each pixel in the color image of the road captured by the image capturing means 2. Thereby, a luminance image is generated with the calculated luminance value Y as pixel data corresponding to each pixel.

The feature value calculation means 4 determines a correction factor RATE for calculating a feature value KY' of each pixel in the color image of the road captured by the image capturing means 2 on the basis of the luminance value Y of each pixel. Furthermore, the feature value calculation means 4 calculates a feature value KY' by dividing a difference KY between two given values corresponding to the color of the road sign among the color components of each pixel in the color image by the correction factor RATE. Thereby, a feature image is generated with the calculated feature value KY' as pixel data corresponding to each pixel.

The road sign detection means 5 performs a filtering process for the feature image by using a tophat filter. Moreover, the road sign detection means 5 combines the filtered feature image with the luminance image to detect a lane mark (corresponding to the road sign of the present invention) from the combined image. The road sign detection means 5 can use a common technique as disclosed in Patent Document 1 or Patent Document 2 described above, as a technique for detecting a lane mark.

Subsequently, the operation (a road sign recognition process) of the road sign recognition device 1 according to this embodiment will be described with reference to the flowchart shown in FIG. 2. The following describes the operation by giving an example in which an area in the sun (sunny area A2) exists concurrently with an area in the shadow (shaded area A3) in the color image of the road as shown in FIG. 3. A lane mark A0 included in the sunny area A2 and a lane mark A1 included in the shaded area A3 in FIG. 3 are yellow lines and to be detected by the road sign recognition device 1.

First, the image capturing means 2 captures a color image I0 of the road by inputting a video signal output from the color video camera 6 (step 001). Note that the color image I0 is composed of m×n pixels as illustrated in FIG. 4(a). Each pixel P0 of the color image I0 has data of R, G, and B values as color components and is represented by $P0(i, j)=(R_{ij}, G_{ij}, B_{ij})$, where i and j are the coordinates of each pixel and integers satisfying $0 \leq i \leq m$ and $0 \leq j \leq n$, respectively.

Subsequently, in step 002, the luminance value calculation means 3 calculates a luminance value $Y_{ij}$ according to $Y_{ij}=\alpha \times R_{ij}+\beta \times G_{ij}+\gamma \times B_{ij}$ from the R, G, and B values ($R_{ij}, G_{ij}, B_{ij}$) of each pixel P0(i, j) of the captured color image I0. Note, however, that α, β, and γ are given coefficients satisfying α+β+γ=1. This allows the generation of a luminance image I1 composed of m×n pixels, having the luminance value $Y_{ij}$ as data of each pixel P1(i, j), as shown in FIG. 4(b). The luminance image I1 reflects the light and dark distribution of the color image I0 of the road.

Subsequently, in step 003, the feature value calculation means 4 calculates the feature value KY'. First, the feature value calculation means 4 calculates a difference $KY_{ij}$ between the R and B values according to $KY_{ij}=R_{ij}-B_{ij}$ from the R and B values ($R_{ij}, B_{ij}$) of each pixel P0(i, j) of the captured color image I0. Note that $R_{ij}$ and $B_{ij}$ are two given values corresponding to the yellow color which is the color of the lane marks A0 and A1. This allows the generation of an image I2 composed of m×n pixels, having the difference $KY_{ij}$ between the R and B values as data of each pixel P2(i, j), as shown in FIG. 4(c). The image I2 shows the feature of the yellow lines in the color image I0 more noticeably. In this situation, the lane mark A0 area included in the sunny area A2 is different from the lane mark A1 area included in the shaded area A3 in the level of the difference KY between the R and B values due to the effect of the illumination state.

Subsequently, the feature value calculation means 4 determines a correction factor $RATE_{ij}$ based on the luminance value $Y_{ij}$ of each pixel P1(i, j) of the luminance image I1. In this instance, the feature value calculation means 4 determines m×n correction factors $RATE_{ij}$ (=P3(i, j)) as shown in M3 of FIG. 4(d). The correction factors $RATE_{ij}$ are determined on the basis of a graph showing a relationship between the luminance value Y and the correction factor RATE, for example, as shown in FIG. 5. The graph in FIG. 5 shows a relationship between the luminance value Y and the correction factor RATE with the abscissa axis representing the luminance value $Y_{ij}$ of each pixel P1(i, j) in the luminance image I1 and the ordinate axis representing the correction factor $RATE_{ij}$. According to the graph in FIG. 5, the correction factor $RATE_{ij}$ is determined to be higher as the luminance value $Y_{ij}$ increases if the luminance value $Y_{ij}$ is equal to or higher than a given luminance value Y_th. If the luminance value $Y_{ij}$ is lower than the given luminance value Y_th, the correction factor $RATE_{ij}$ is determined to be RATE_th which is the correction factor set when the luminance value Y is the given luminance value Y_th.

The feature value calculation means 4 then calculates the feature value $KY'_{ij}$ by dividing the difference $KY_{ij}$ between the R and B values by the correction factor $RATE_{ij}$. This allows the generation of a feature image I4 having the feature value $KY'_{ij}$ as data of each pixel P4(i, j) as shown in FIG. 4(e). Then, a feature image I4 is obtained with the feature value KY' of the lane mark A0 area included in the sunny area A2 calculated so as to be at the same level of brightness as the feature value KY' of the lane mark A1 area included in the shaded area A3.

Subsequently, in step 004, the road sign detection means 5 performs the filtering process for the feature image I4 by using the tophat filter. Specifically, the road sign detection means 5 generates a binary image where the output of filtering the feature image I4 with the tophat filter is binarized by a given threshold value. In the feature image I4, the feature value KY' is calculated in such a way as to inhibit the change in level of the feature value KY' based on a difference in brightness by means of the process of calculating the feature value KY' in the above step 003. Therefore, the road sign detection means 5 can generate a binary image where the lane marks A0 and A1 (yellow lines) are extracted with the lane marks A0 and A1 appropriately separated from the surrounding road surface by means of the filtering process.

Subsequently, in step 005, the road sign detection means 5 combines the feature image subjected to the filtering process with the luminance image I1. Specifically, the road sign detection means 5 combines the feature image (binary image) subjected to the filtering process with the luminance image I1 with the value of the white area in the feature image set to the same value as the maximum of the luminance value of the luminance image I1. Next, in step 006, the road sign detection means 5 performs a lane mark detection process for the combined image. The feature image subjected to the filtering process, which is an image generated by extracting a yellow line in the color image I0, is combined in step 005 with the luminance image I1, which is an image generated by enhancing a white line in the color image, by which, if the white line and the yellow line exist together in the color image, the road sign detection means 5 can detect the yellow line and the white line at a time in the lane mark detection process in step 006.

Through the above processes, the road sign recognition device 1 can accurately detect the lane marks A0 and A1 from the road color image captured by the color video camera 6 even if the road illumination state is partially different.

Although the road sign recognition device 1 includes the luminance value calculation means 3 in the first embodiment, the luminance value calculation means 3 can be omitted, but instead the feature value calculation means 4 can use a ratio between two given values corresponding to the color of the road sign among the color components of each pixel of the road color image I0 captured by the image capturing means 2 as the feature value KY' as a second embodiment (which corresponds to the first aspect of the present invention).

According to the above, the feature value calculation means 4 uses a ratio between the R and B values as the feature value KY' according to $KY'_{ij}=R_{ij}/B_{ij}$, instead of using a value obtained by dividing the difference $KY_{ij}$ between the R and B values by the correction factor $RATE_{ij}$ as the feature value KY' when calculating the feature value KY' (step 003 in FIG. 2 in the first embodiment). Note here that the ratio between the R and B values indicates the feature of the yellow line in the color image I0 noticeably and is at the same level of brightness for each pixel in the color image I0.

Also in the above case, the feature value KY' is calculated in such a way as to inhibit the change in level of the feature value KY' based on a difference in brightness by means of the process of calculating the feature value KY' in the above step 003, and therefore the road sign detection means 5 can accurately detect the lane marks A0 and A1. Therefore, the road sign recognition device according to this embodiment produces the same operation and effect as in the case where the road sign recognition device 1 includes the luminance value calculation means 3 as described above.

Furthermore, although the color components of pixel data are R, G, and B values in the image capturing means 2 in the first and second embodiments, alternatively CMY output color components for pixel data can be used. In this instance, the feature value KY' of each image is calculated using C, M, and Y values.

Moreover, in the first embodiment, the luminance value calculation means 3 can calculate the luminance value Y by using the maximum value Max and the minimum value Min of the R, G, and B values according to Y=(Max+Min)/2. Alternatively, it can use the G value as the luminance value Y.

Alternatively, in the first embodiment, the image capturing means 2 can obtain an output of a monochromatic signal from the color video camera 6 as a monochromatic component of the pixel data together with the color components of the pixel data, and luminance value calculation means 3 can use the monochromatic component as the luminance value Y.

Furthermore, although the feature value calculation means 4 uses the value obtained by dividing the difference KY between two given values by the correction factor RATE as the feature value KY' in the first embodiment, it is also possible to use a value obtained by dividing a sum of two given values corresponding to the color of the road sign among the color components of each pixel of the road color image I0 captured by the image capturing means 2 by the correction factor RATE.

Moreover, in the first embodiment, the feature value calculation means 4 can calculate the correction factor RATE according to a correlation equation between a preset luminance value Y and the correction factor RATE, instead of determining it from the graph shown in FIG. 5. Alternatively, the feature value calculation means 4 can determine the correction factor RATE by using a data table or the like showing the correspondence between the preset luminance value Y and the correction factor RATE.

Furthermore, in the first and second embodiments, the road sign detection means 5 can perform the filtering process by using an edge filter, instead of using the tophat filter when filtering the feature image I4. In this instance, the lane marks A0 and A1 can be appropriately separated from the surrounding road surface by using the edge filter in the same manner as in the case of using the tophat filter.

Furthermore, in the first and second embodiments, the road sign detection means 5 can, for example, binarize the feature image I4 directly by a given threshold value and output a binary image, instead of filtering the feature image I4.

Moreover, in the first and second embodiments, the road sign detection means 5 can detect lane marks directly in the filtered feature image, instead of combining the filtered feature image with the luminance image I1. According thereto, only a road sign having a given color (yellow or the like) is detected.

Moreover, although the road sign recognition device detects the yellow road sign in the first and second embodiments, the same effect of the present invention can be achieved also in the case of detecting a road sign having any other color by setting a feature value KY corresponding to the color concerned.

Moreover, although the road sign recognition device detects the yellow line as a road sign in the first and second embodiments, the same effect of the present invention can be achieved also in the case of detecting any other type of lane marks (Botts Dots, cat's eye, or the like), road markings, or the like.

INDUSTRIAL APPLICABILITY

The present invention, as described above, is adapted for use in providing a driver with information in a vehicle or controlling vehicle behaviors since it can accurately detect a road sign such as a lane mark by processing a color image of the road in front of the vehicle.

What is claimed is:
1. A vehicle comprising:
an imaging means;
an image capturing means which captures a color image of a road via the imaging means;
a feature value calculation means which calculates a feature value of each pixel corresponding to the color of a road sign on the road from the color components of each pixel in the color image so as to reduce the effect of brightness on the color components; and a road sign detection means which detects the road sign on the road from the feature image in which the feature value of each pixel in the color image is arranged so as to match with the position of each pixel in the color image.

2. A vehicle according to claim 1, wherein:

the color components of each pixel in the color image are R, G, and B values or C, M, and Y values; and the feature value calculation means uses a ratio between two given values corresponding to the color of the road sign among the color components of each pixel as the feature value of each pixel in the color image.

3. A vehicle comprising:

an imaging means;

an image capturing means which captures a color image of a road via the imaging means;

a luminance value calculation means which calculates a luminance value of each pixel from the color components of each pixel in the color image;

a feature value calculation means which calculates a feature value of each pixel corresponding to the color of a road sign on the road from the color components of each pixel in the color image and the luminance value so as to reduce the effect of brightness on the color components; and a road sign detection means which detects the road sign on the road from the feature image in which the feature value of each pixel in the color image is arranged so as to match with the position of each pixel in the color image.

4. A vehicle according to claim 3, wherein:

the color components of each pixel in the color image are R, G, and B values or C, M, and Y values; and the feature value calculation means uses, as the feature value of each pixel in the color image, a value obtained by dividing a difference between or sum of two given values corresponding to the color of the road sign among the color components of each pixel by a given correction factor which is determined to be higher as the luminance value increases according to the luminance value of each pixel.

5. A vehicle according to claim 3, wherein:

the color components of each pixel in the color image are R, G, and B values or C, M, and Y values; and the feature value calculation means uses, according to the luminance value of each pixel and as the feature value of each pixel in the color image, a value obtained by dividing a difference between or sum of two given values corresponding to the color of the road sign among the color components of each pixel by a given correction factor, which is determined to be higher as the luminance value increases, if the luminance value is equal to or higher than a given luminance value and uses a value obtained by dividing the difference or sum by the given correction factor, which is set for the given luminance value, if the luminance value is lower than the given luminance value.

6. A vehicle according to one of claims 1 to 5, wherein the road sign detection means detects the road sign on the road by performing a filtering process using a tophat filter or an edge filter for the feature image.

7. A road sign recognition device comprising:

an image capturing means which captures a color image of a road via an imaging means;

a feature value calculation means which calculates a feature value of each pixel corresponding to the color of a road sign on the road from the color components of each pixel in the color image so as to reduce the effect of brightness on the color components; and a road sign detection means which detects the road sign on the road from the feature image in which the feature value of each pixel in the color image is arranged so as to match with the position of each pixel in the color image.

8. A road sign recognition device according to claim 7, wherein:

the color components of each pixel in the color image are R, G, and B values or C, M, and Y values; and the feature value calculation means uses a ratio between two given values corresponding to the color of the road sign among the color components of each pixel as the feature value of each pixel in the color image.

9. A road sign recognition device comprising:

an image capturing means which captures a color image of a road via an imaging means;

a luminance value calculation means which calculates a luminance value of each pixel from the color components of each pixel in the color image;

a feature value calculation means which calculates a feature value of each pixel corresponding to the color of a road sign on the road from the color components of each pixel in the color image and the luminance value so as to reduce the effect of brightness on the color components; and a road sign detection means which detects the road sign on the road from the feature image in which the feature value of each pixel in the color image is arranged so as to match with the position of each pixel in the color image.

10. A road sign recognition device according to claim 9, wherein:

the color components of each pixel in the color image are R, G, and B values or C, M, and Y values; and the feature value calculation means uses, as the feature value of each pixel in the color image, a value obtained by dividing a difference between or sum of two given values corresponding to the color of the road sign among the color components of each pixel by a given correction factor which is determined to be higher as the luminance value increases according to the luminance value of each pixel.

11. A road sign recognition device according to claim 9, wherein:

the color components of each pixel in the color image are R, G, and B values or C, M, and Y values; and the feature value calculation means uses, according to the luminance value of each pixel and as the feature value of each pixel in the color image, a value obtained by dividing a difference between or sum of two given values corresponding to the color of the road sign among the color components of each pixel by a given correction factor, which is determined to be higher as the luminance value increases, if the luminance value is equal to or higher than a given luminance value and uses a value obtained by dividing the difference or sum by the given correction factor, which is set for the given luminance value, if the luminance value is lower than the given luminance value.

12. A road sign recognition device according to one of claims 7 to 11, wherein the road sign detection means detects the road sign on the road by performing a filtering process using a tophat filter or an edge filter for the feature image.

* * * * *